United States Patent [19]

Edwards et al.

[11] Patent Number: 5,749,205
[45] Date of Patent: May 12, 1998

[54] AUTOMATED APPARATUS AND METHOD FOR CONSOLIDATING PRODUCTS FOR PACKAGING

[75] Inventors: Russell James Edwards; Mary Louis Dolan, both of Jacksonville, Fla.; Svend Christensen, Allinge; Borge Peter Gundersen, Tikob, both of Denmark; John Mark Lepper, Jacksonville, Fla.; Daniel Tsu-Fang Wang, Jacksonville, Fla.; Richard Wayne Abrams, Jacksonville, Fla.; Thomas Christian Ravn, Helsignor, Denmark

[73] Assignee: Johnson & Johnson Vision Products, Inc., Jacksonville, Fla.

[21] Appl. No.: 464,243

[22] Filed: Jun. 5, 1995

Related U.S. Application Data

[62] Division of Ser. No. 257,791, Jun. 10, 1994, Pat. No. 5,528,878.

[51] Int. Cl.[6] .................................................. B65B 35/30
[52] U.S. Cl. ........................... 53/542; 53/543; 198/429; 198/689.1
[58] Field of Search ............................ 53/542, 543, 55; 198/429, 430, 438, 428, 689.1, 462.1

[56] References Cited

U.S. PATENT DOCUMENTS

| | | |
|---|---|---|
| 3,685,632 | 8/1972 | Brady .................. 198/438 |
| 4,263,769 | 4/1981 | Hanazawa et al. ............. 53/542 |
| 4,371,076 | 2/1983 | Nakao .................. 198/429 |
| 4,642,967 | 2/1987 | Culpepper ................ 53/543 |
| 5,035,105 | 7/1991 | Qvarnstrom ............... 53/543 |
| 5,311,979 | 5/1994 | Risley et al. ............ 198/689.1 |
| 5,373,933 | 12/1994 | Planke et al. ........... 198/689.1 |
| 5,607,642 | 3/1997 | Lepper et al. ............. 198/340 |

*Primary Examiner*—John Sipos
*Assistant Examiner*—Gene L. Kim

[57] ABSTRACT

An automated apparatus for controlling the automatic packaging of contact lenses in a contact lens fabrication facility includes: a first robotic transfer device for periodically transferring a first predetermined amount of individual packages from an inspection station to an intermediate consolidation buffer and depositing the packages on the consolidation buffer; a control device for tracking and identifying each individual contact lens conveyed from the inspection station to the consolidation buffer and including memory and logic circuits for storing the identity of individual packages containing contact lenses that have been previously determined at the inspection station as being out of specification, and, generating a signal to enable the first robotic device to discard any individual package identified as out of specification; and, a second robotic assembly for periodically transferring a second predetermined amount of individual packages from the consolidation buffer to a second processing station, the control device enabling the first robotic device to provide a sufficient amount of individual packages to the consolidation buffer to enable the second robotic assembly to continuously transfer the second predetermined amount of packages to the second processing station in every period.

10 Claims, 8 Drawing Sheets

FIG. I

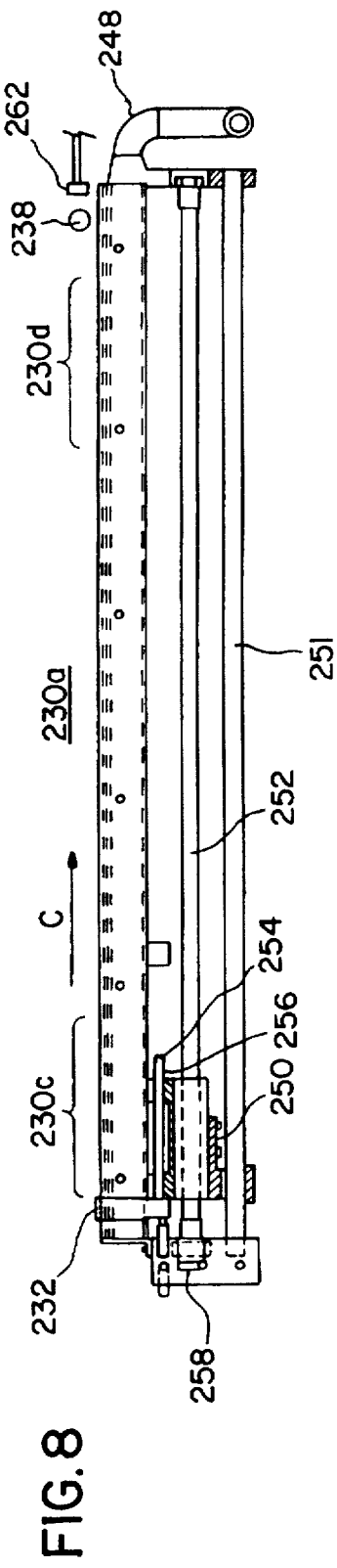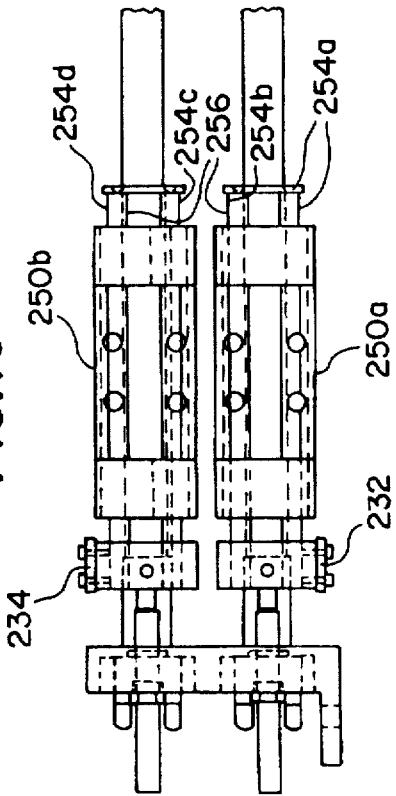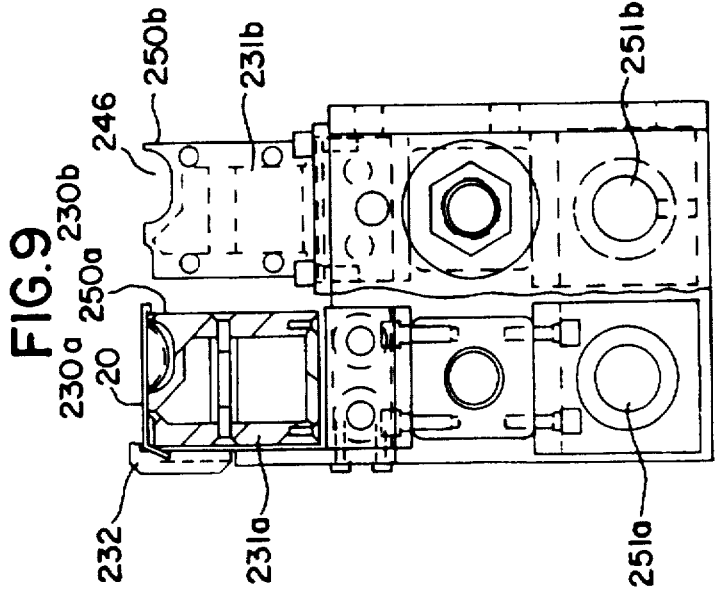

1

AUTOMATED APPARATUS AND METHOD FOR CONSOLIDATING PRODUCTS FOR PACKAGING

This is a divisional of application Ser. No. 08/257,791 now U.S. Pat. No. 5,528,878, filed on Jun. 10, 1994.

FIELD OF THE INVENTION

The present invention relates generally to the field of manufacturing ophthalmic lenses, especially molded, hydrophilic contact lenses, and more specifically to an automated apparatus for consolidating contact lenses for packaging after inspection thereof.

DESCRIPTION OF THE PRIOR ART

The molding of hydrophilic contact lenses is disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by sandwiching monomer or monomer mixture between a front curve (lower) mold section and back curve (upper) mold section, carried in a two by four mold array. The monomer is polymerized, thus forming a lens which is then removed from the mold sections and further treated in a hydration bath and packaged for consumer use.

U.S. Pat. Nos. 5,080,839 and 5,094,609 disclose respectively a process for hydrating contact lenses and a chamber for hydrating contacts lenses formed with a monomer or monomer mixtures disclosed in the forgoing patents. The process disclosed in these patents significantly reduce the thruput time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

U.S. Pat. No. 4,961,820, also assigned to the assignee of the present invention, discloses a final package for a contact lens, wherein the package is formed from a transparent plastic material such as polypropylene and a foil laminate that is heat sealed thereto.

While U.S. Pat. Nos. 5,080,839 and 5,094,609 contemplate that the entire hydration process and transfer to final packaging may take place in a fully automated fashion, and while the chamber and process described in the foregoing patents enabled automated handling of the lens during hydration, suitable automated equipment to inspect and handle the lenses at high production rates and implement the methods thereof in a fully automated apparatus was not readily available or taught by the prior art.

SUMMARY OF THE INVENTION

Recent developments in the inspection of contact lenses produced in accordance with the foregoing methods has enabled automated lens inspection, as taught in U.S. Ser. No. 07/993,756 entitled "Lens Inspection Method and Apparatus", (VTN 0037) assigned to the assignee of the present invention. Further, recent developments in the hydration and automated handling of wet contact lenses, as taught in U.S. Ser. No. 08/258,556 "Automated Method and Apparatus for Hydrating Soft Contact Lenses" (Docket 8998), also assigned to the assignee in the present invention, has enabled automatic robotic handling of lenses during hydration, and prior to the inspection thereof by the automated lens inspection system.

The removal of lenses, that are out of product specification, from a serial product stream of contact lenses generates random variations in the product flow which must be consolidated prior to packaging.

The present invention therefor provides an automated apparatus for consolidating serial product flow wherein the product flow includes random variations in the flow. The present invention provides a consolidation buffer for receiving the serial products from the production line, and then consolidating random variations in the product flow. The automated robotic handling means then selects a predetermined number and arrangement of product units and transports that number and arrangement to a subsequent packaging station for packaging, sterilization, and final shipment.

It is further an object of the present invention to provide a robotic transfer means for receiving serial product flow, and selectively ejecting individual product units in response to data signals from the automated lens inspection system.

It is further an object of the present invention to provide a consolidation buffer between two serial production operations, wherein the number and arrangement of product varies between input and output. The present invention enables use of a first x,y array of product units merging from a serial production line, and consolidating those product units into a second x,y array of units which corresponds to an array used in second production operation relating to the product.

It is further an object of the present invention to provide a programmable logic controller which maintains a status count for each of the individual products in the consolidation buffers of the present invention, including a count for each random addition of product, and a separate count for each selection and transport of product from the buffers to the final packaging station.

It is another object of the present invention to provide a method and apparatus for the high speed robotic handling of discrete final packages of product having a soft contact lens carried therein. This robotic handling enables selective ejection or rejection of specific lenses, even when carried in a predetermined X,Y array, when one or more of said lenses have been flagged as flawed or out of spec by the automated lens inspection system.

It is another object of the present invention to provide an automated control means for sequencing and coordinating each of the robotic assemblies used in the transfer of lenses from the automated lens inspection system to final packaging.

While the invention is described with particular reference to molded contact lenses wherein the lens has been molded between a first and second mold half, as described in U.S. Ser. No. 08/258,654 "Consolidated Contact Lens Molding" (Docket 9016) it is understood the present consolidation apparatus is equally suitable for the consolidation of lenses formed by lathe cutting wherein the hydrogel is maintained at a dry state while the desired optical surfaces are cut and polished. Further, the apparatus of the present invention may also be used in consolidating spin cast lenses which subject a liquid monomer to centrifugal force in a mold which has the same shape as the desired optical surfaces of the lens.

BRIEF DESCRIPTION OF THE DRAWINGS

The foregoing objects and advantages of the present invention for an automated apparatus and method for consolidating products for packaging may be more readily understood by one skilled in the art with reference being had to the following detailed description of the preferred embodiments, taken in conjunction with the accompanying drawings, wherein like elements are designated by identical reference numerals throughout the several views, and in which:

FIG. 8 is an elevation view of the vacuum rail consolidation buffer of the present invention.

FIG. 9 is a cross-sectional view of the apparatus illustrated in FIG. 8.

FIG. 10 is an enlarged plan view of the drive mechanism utilized in the consolidation buffer of FIG. 8.

DETAILED DESCRIPTION OF THE PREFERRED EMBODIMENTS

Figure 1:
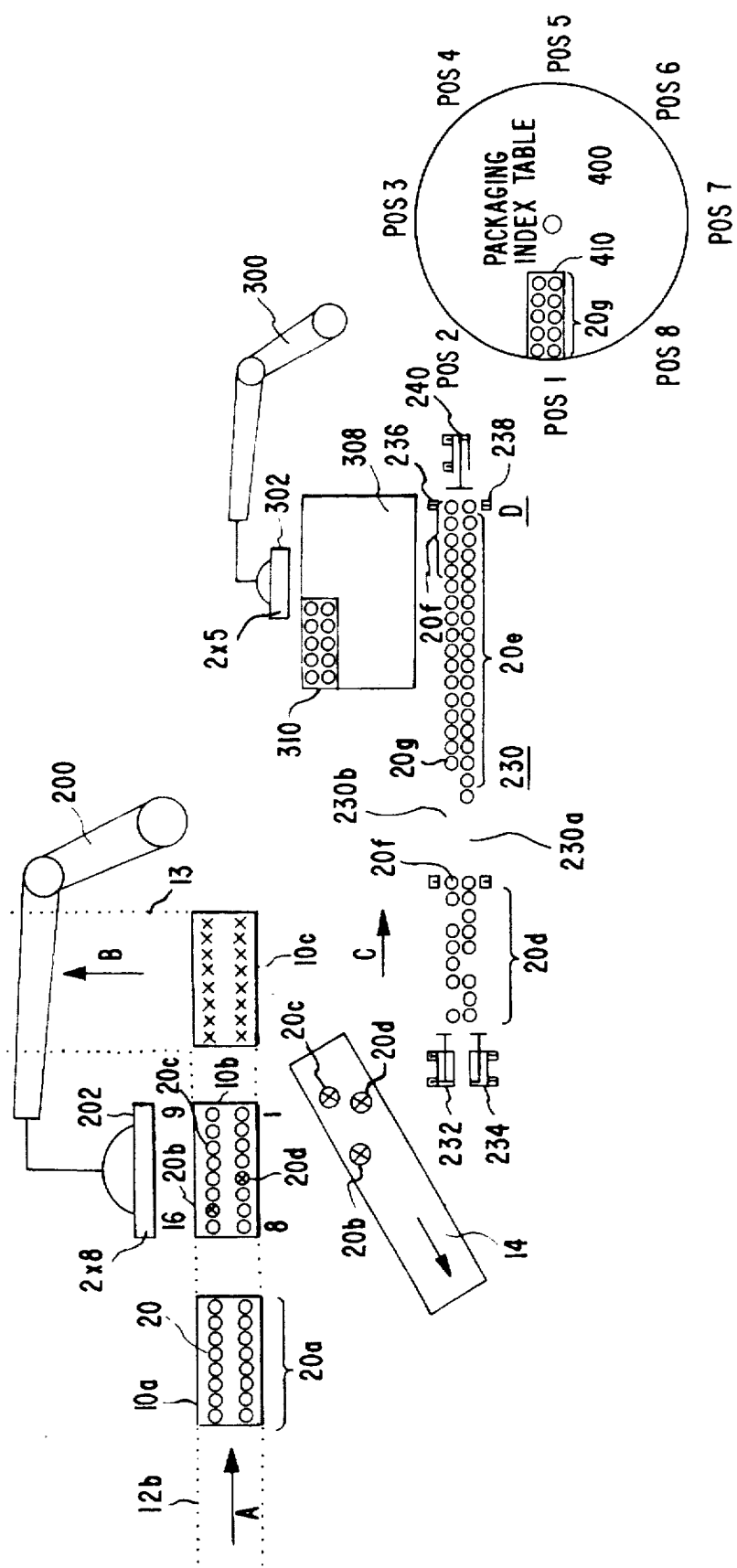
FIG. 1 is a diagrammatic illustration of plural robotic handling means, and a consolidation buffer for removing random variations in product flow.
Figure 2:
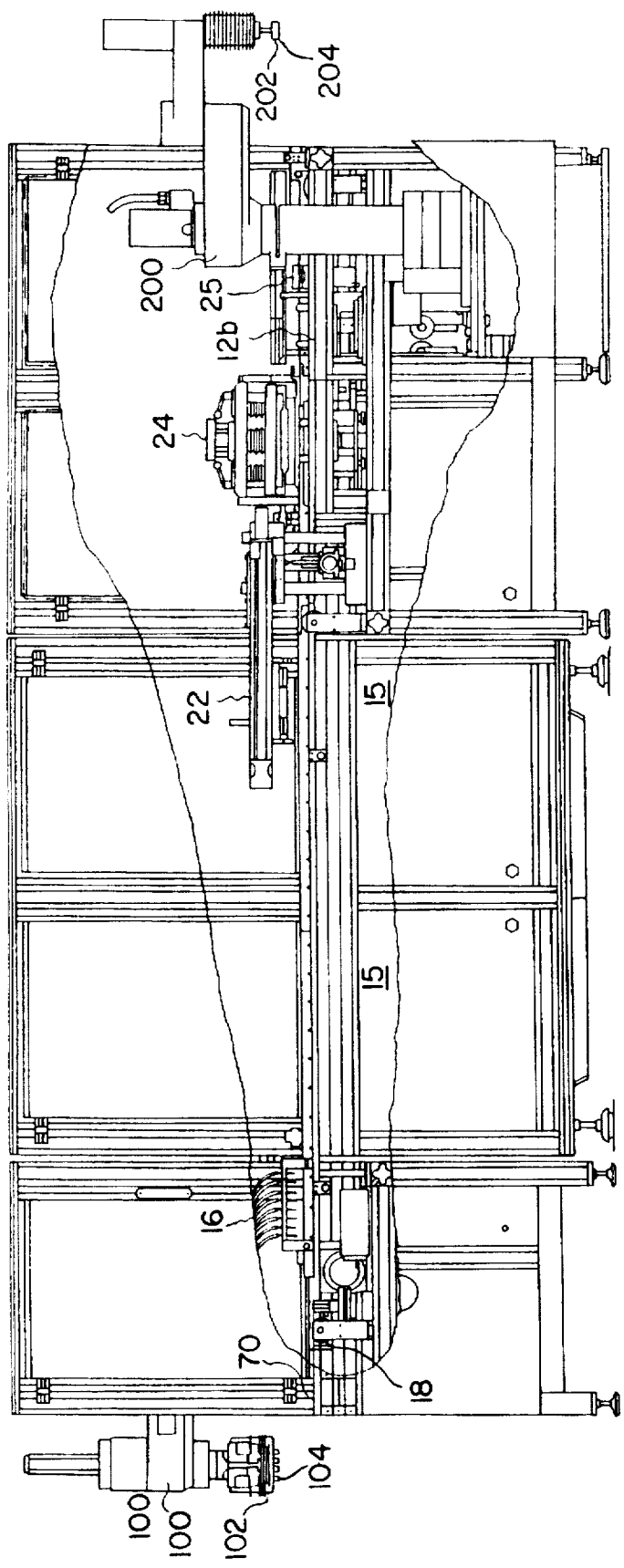
FIG. 2 is an elevation view of the automated lens inspection system and the stations utilized in the initial handling of the lenses prior to the automated lens inspection.

FIG. 1 is a diagrammatic illustration of the automated apparatus of the present invention used to consolidate serial product flow when the serial product flow has random variations therein. While prefigured 2×8, 2×5 and 4×8 arrays are used in the description of the present invention, it is understood that a variety of arrays and configurations may be used in the practice of the invention described herein.

As illustrated in FIG. 1, an inspection pallet 10 carrying sixteen product articles 20, arranged in a 2×8 array 20(a) is transported in the direction of arrow A from an automated inspection system that has separately reviewed each of the products 20 according to a predefined product criteria. Pallet 10 travels on a conveyor 12(b) through each of the three positions 10(a),(b) and (c) illustrated in FIG. 1. After the products have been removed from the inspection pallet 10, as indicated in 10(c), the empty inspection pallets are returned via return conveyor 13 to be refilled with product.

A robotic handling device 200 is positioned adjacent conveyors 12, 13 and has mounted thereon a 2×8 vacuum array 202 having sixteen independently actuable vacuum gripping means mounted thereon. Pallet 10(b) is conveyed along conveyor 12 to a predetermined product pick point, as illustrated in FIG. 1 and the 2×8 array 202 is positioned thereabove to remove each of the sixteen products from the inspection carrier 10(b). As illustrated in FIG. 1, products 20(b),(c) and (d) have been marked with an "X" to diagrammatically illustrate the removal of flawed or out spec products. In the practice of the present invention, a programmable logic controller is used to control the various elements of the present invention and receives a datablock from the automated inspection system having a flag set for each of the products 20(b), (c) and (d) that are flawed or out of spec.

After the products 20 have been removed from the inspection carrier 10(b), the robotic transfer device 200 positions the 2×8 array over conveyor belt 14 and selectively discharges the products 20(b), (c) and (d). Those products are then removed by conveyor 14 for subsequent destruction or recycling.

The robotic device 200 then places the remaining products on a vacuum consolidation buffer 230 as indicated at 20(d). The product array as deposited at 20(d) includes gaps or random variations in the product flow resulting from the removal of the out of spec products 20(b), (c) and (d) from the serial product flow. The vacuum consolidation buffer 230 includes a pair of pneumatic product followers 232,234 which are used to consolidate the product group 20(d) with product group 20(e). Each of the pneumatic followers 232, 234 is independently advanced in the direction of arrow C until the product stream is consolidated. As product 20(f) encounters product 20(g), the entire stream of product driven by product follower 232 will advance and trigger an optical sensor 236, which generates a control signal for the programmable logic controller to de-energize product follower 232 and return the follower to the initial start position. Likewise, optical sensor 238 generates a similar return signal for product follower 234 when the second product stream has been consolidated. After consolidation of the product, a separate indexing mechanism 240 returns the entire product stream in the direction of arrow D to a predetermined registration point for subsequent robotic handling. In the present invention, the consolidation buffer 230 includes a pair of vacuum rails which lightly grip the product to permit sliding movement of the product along the rails in response to product followers 232,234, but which will prevent "shingling" of the product during consolidation.

A package feed robotic handling device 300 is positioned between the consolidation buffer 230 and a packaging station 400, and is equipped with an array 302 which contains ten vacuum gripping means arranged in a 2×5 matrix. The 2×5 array 302 is first positioned over product group 20(f) and the vacuum gripping means is actuated to withdraw the first ten products from the vacuum consolidation rail 230. The packaging robotic handling device 300 then positions the 2×5 array and product group 20(f) over position 1 on the packaging indexing table 400, and drops the array of products onto support pallet 410 mounted on the packaging indexing table 400. For the purposes of illustrating the operation of the invention, only a single support pallet 410 is illustrated on the packaging indexing table 400, although it is understood that in actual practice eight such support pallets are provided, one for each index position. The ten product units 20(g), carried by support pallet 410 are then indexed to position 2 for product verification, and to position 3 for subsequent product packaging operations.

During packaging, the packaging index table 400 rotates support pallets 410 from position to position to enable the products to undergo subsequent packaging steps. In the event there is a malfunction or delay in the operation of the packaging indexing table 400, the incoming product arriving on consolidation buffer 230 is temporarily stored in a buffer area 308 which has a plurality of buffer pallets 310 positioned therein. When the packaging index table 400 resumes operation, the package robotic handling device 300 will then transfer products in the 2×5 arrays from the buffer pallets 310 to the support pallets 410 on a first-in, first-out basis.

If the product being handled is time sensitive, the programmable logic controller can generate a time stamp to be placed with each product array as it is transferred from any given processing station to any subsequent processing station. Thus, a time stamp may be placed on the product when inspected, or when transferred to the buffer area 308. If the product is transferred to buffer 308, the X,Y coordinates of the array are also stored with the time stamp. If the time sensitive allotment expires before packaging index table 400 has resumed operation, the packaging robotic handling device 300 will then discard expired time sensitive product, and will transfer only product meeting the time sensitive criteria to the support pallet 410. Likewise, if a problem in the production line results in an inordinate number of products being rejected, so that less than five products are available on either consolidation string 230(a),(b) at position 20(e) then the robotic handling device 200 will transfer product as necessary to balance product streams on both sides of the packaging consolidation buffer 230, and thereby enable removal of product as a 2×5 product array.

POST HYDRATION PROCESSING

The present invention was designed for and is particularly adapted for use in the post hydration processing section of an automated contact lens production facility. Contact lenses molded in an automated production line, such as that described in copending application U.S. Ser. No. 08/258, 654, entitled "Consolidated Contact Lens Molding"; hydrated in a hydration system as described in U.S. Ser. No. 08/181,275, entitled "System for Handling Contact Lenses During Hydration"; and automatically inspected as described in U.S. Ser. No. 07/993,756 entitled "Lens Inspection Method and Apparatus" are particularly well suited for consolidation and packaging by the present invention.

Figure 6:
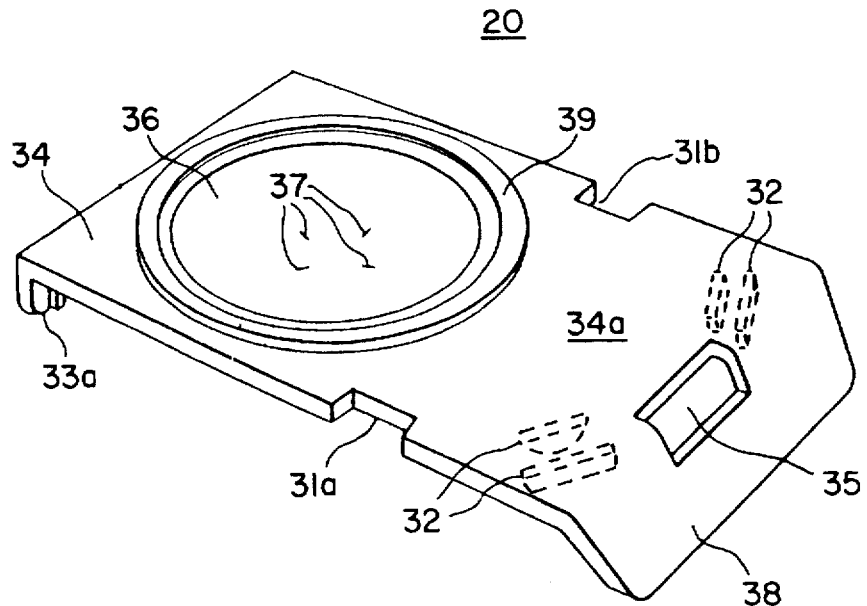
FIG. 6 is an isometric view of a contact lens carrier which serves as both an inspection carrier, and a portion of the final contact lens package.

The present invention envisions a multi-purpose disposable lens package carrier which transports a contact lens during inspection thereof, and serves as a portion of the final packaging after inspection. Package carrier 20 is illustrated in FIG. 6 and is formed from injection molded or thermal formed plastic sheet material, such as polypropylene and includes a planar essentially rectangularly shaped base member 34 having an angularly depending wall portion 38 at one end thereof forming a first flange member and a pair of registration flanges 33(a),33(b), one of which is visible in FIG. 6, at the other end thereof which are used to align the package carrier for robotic handling. This package carrier is more fully described in copending application U.S. Ser. No. 995,607, the disclosure of which is incorporated here by reference thereto. Registration notches 31(a),(b) are provided on either side of the base 34 to cooperate with registration pins on various support pallets used in the processing and packaging operations to register the package carrier and lens for further handling or treatment. Offset from the center of the package is a cavity 36 integrally formed therein which is of an essentially semi-spherical configuration, generally in conformance with a curvilinear shape of a contact lens (not shown) which is adapted to be stored therein in a sealed condition while immersed in a suitable sterile aqueous solution in a manner similar to that described in U.S. Pat. No. 4,691,820 to Martinez; which is assigned to the assignee of the present invention, the disclosure of which being incorporated herein by reference thereto. The height "h" of flange member 38 depending from the planar base member 34 is complimentary to the height or depth of cavity 36, and provides for self alignment of the package carrier in cooperation with depending flanges 33(a) .(b) on specially configured pallet carriers, as will hereinafter be described. Depending flange 38 is also used in the final packaging of the product in cooperation with a plurality of generally "chevron-shaped" ridges 32, which will assist the end user in gripping the package while peeling open a foil laminate cover.

The cavity 36 also includes a plurality of tick marks 37 which are used to assist in holding a contact lens in the centered position in the cavity during the removal of deionized water at one of the post hydration processing stations. The package carrier is also equipped with an annular flange 39 which is used for heat sealing a foil laminate cover in order to provide a hermetic seal for the contact lens during final distribution. A cut-out 35 may optionally be provided to facilitate gripping the flange 38 and the package when the cover stock or foil laminate is removed for consumer usage.

Base member 34 also includes a smooth planar surface 34(a) to provide a suitable engagement zone for vacuum grippers on the upper side, and a vacuum rail on the lower side, which are used to transport the package carrier during various stages of the operation.

Figure 7:
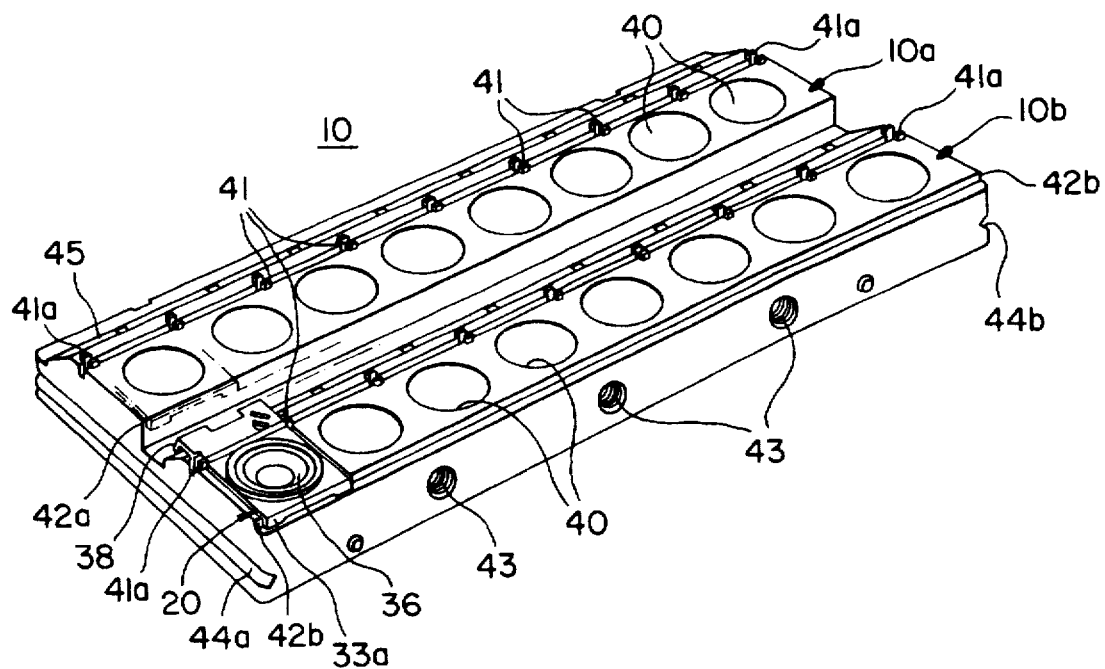
FIG. 7 is an isometric view of an inspection carrier used to transport a plurality of the contact lens carriers illustrated in FIG. 6 through the automated lens inspection system.
Figure 11:
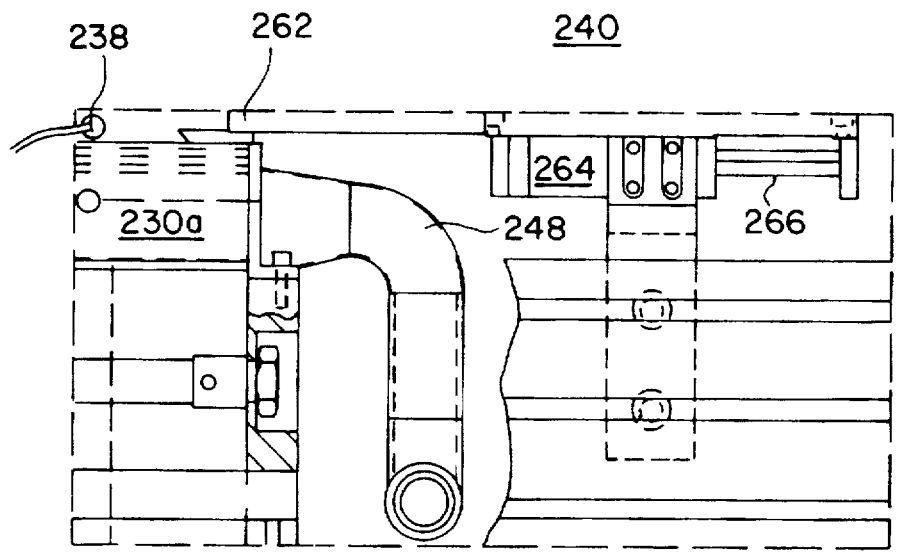
FIG. 11 is an elevation view of an index registration device used to align the consolidated product flow prior to transfer to the packaging station.

An inspection carrier for transporting the package carriers through the automated lens inspection system is illustrated in FIG. 7. The inspection carrier 10 includes a first and second row 10(a),10(b) of cavities 40 which receive the bowl 36 of the package carrier and provide an optical sight path for the automated lens inspection system. Each of the intermediate registration pins 41 engage a package carrier on either side, with the end registration pins 41(a) engaging a single package. These registration pins provide for precise registration of the package carrier in the longitudinal dimension of the inspection carrier while a pair of hard edges 42(a),42(b) provide a reference surface for the downwardly descending flanges 33(a),33(b), which together with pins 41 register the carrier package against rotational skewing. The inspection pallet 10 is further provided with three registration openings 43 on either side of the pallet which are used to transport the pallet through the automatic lens inspection station and to lock the pallet in place during loading and unloading of the package carriers. The inspection pallet is further provided with a pair of grooves 44(a),44(b) which provide a positive grip for an overhead transport mechanism that places and then removes the inspection pallet from the automatic lens inspection system. A pair of slanted faces 45 provide clearance for the downwardly descending flange member 38 of the package carrier 20.

Figure 3:
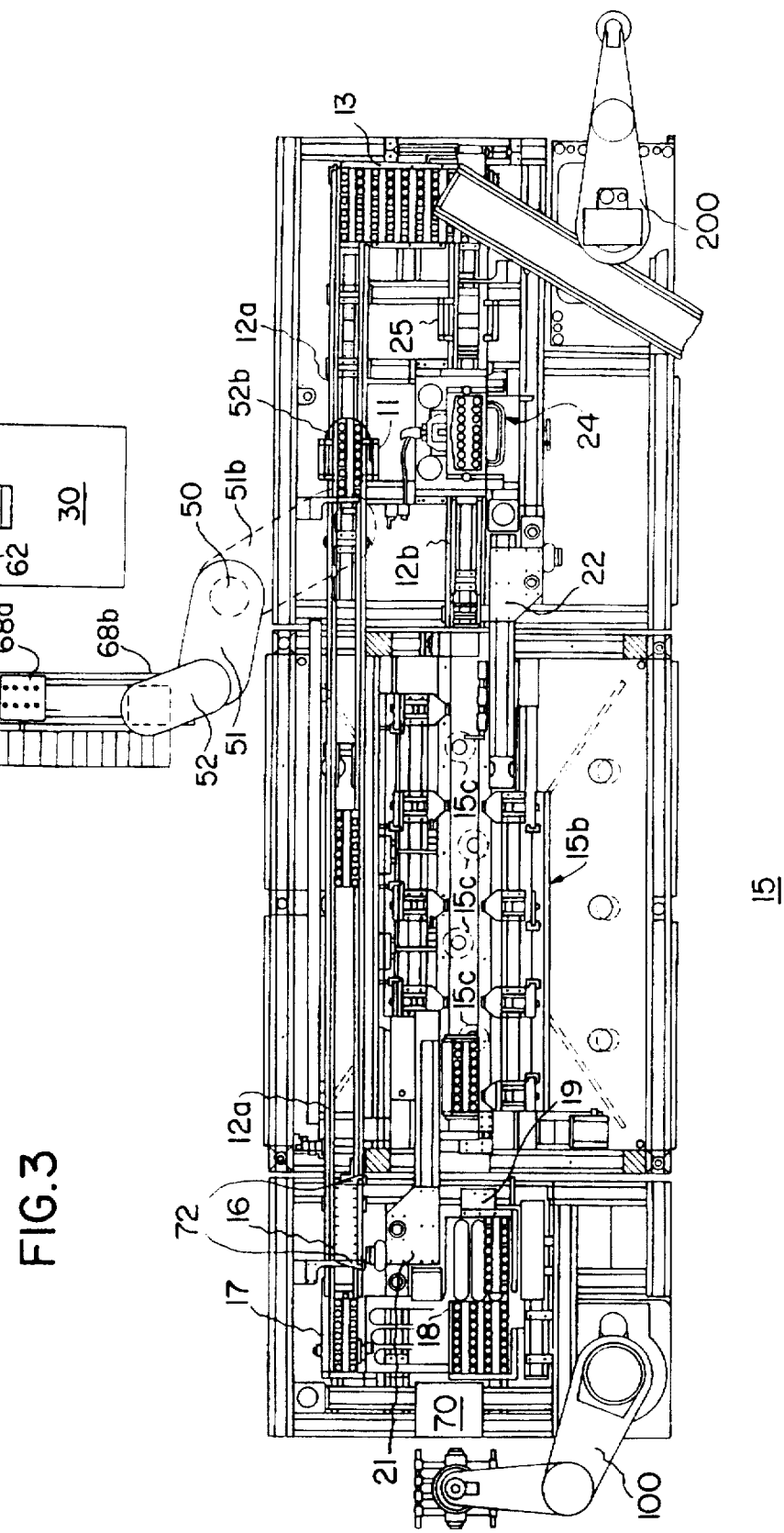
FIG. 3 is a plan view of the apparatus illustrated in FIG. 2.
Figure 4:
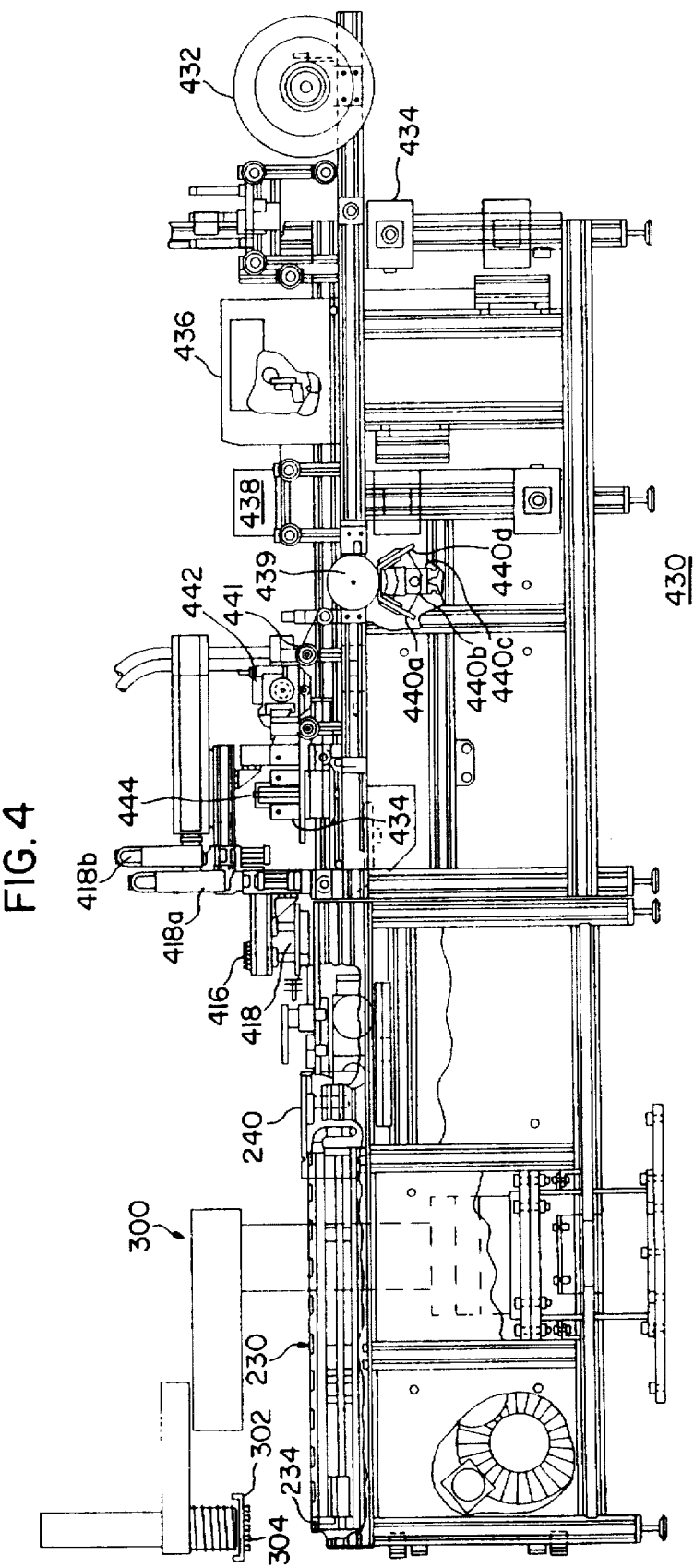
FIG. 4 is an elevation view of the consolidation buffer of the present invention, and the packaging apparatus to which the consolidated product flow is transferred.

As illustrated in FIG. 3, an injection mold machine 30 is used to mold the polypropylene package carriers 20 which serve a dual purpose in the invention concept. First, to provide a carrier for the inspection of the lens by the automated lens inspection system, and secondly, to provide a receptacle for the final packaging of the lens for distribution to end use consumers. These package carriers are molded in predetermined array, typically in clusters of sixteen per mold cycle, and removed from the injection mold by a robotic transfer means 60 having a rapidly reciprocating low mass transport carrier 62. The carrier 62 includes a hand member 64 having a plurality of vacuum gripper means thereon which are arranged to correspond to the array of mold cavities within the injection molding machine 20. Carrier 62 reciprocates along support member 26 and is rotatable from a vertical orientation as illustrated in FIG. 3, to a horizontal orientation necessary to place the packaged carriers into a secondary transfer shuttle 68. Secondary transfer shuttle 68 is used to transport a plurality, i.e. sixteen of the package carriers from a first receiving position 68(a) illustrated in FIG. 3 to a second position 68(b) where the package carriers are picked up by a robotic handling device 50. Robotic handling device 50 is articulated, having first and second arms 51,52 and a vertically reciprocating arm and hand (not shown) having a plurality of vacuum gripping means thereon which engage each of the package carriers transported by the transfer shuttle 68.

The package carriers 20 are then removed from the transfer shuttle 68 and placed on an inspection pallet 10 at a pallet loading station 11. In the preferred embodiment the package carriers are molded in a 4×4 array to maximize the efficiencies inherent in such an array for molding, which are transported in the inspection pallet 10 in a 2×8 array. When these two arrays are used, robotic handling device 50 makes two separate transfers, and transfers a 2×4 array in each transfer. The loaded pallet 10 is then moved by conveyor 12(a) to a deionized water injection station 16 wherein each of the package carriers transported on the inspection pallet are partially filled with degassed and deionized water. The inspection pallet is then transferred by a push conveyor 17 to a lens loading area 18 where it is batched with a second pallet to provide a contiguous loading area with thirty-two package carriers, each of which has been dosed with degassed and deionized water.

A first robotic transfer device 100 having a plurality of convex lens carrier elements 110 mounted thereon then removes thirty-two contact lenses from the preceding hydration station as described in U.S. Ser. No. 08/258,556, entitled "Automated Method and Apparatus for Hydrating Soft Contact Lenses", (Docket 8998). The robotic transfer device 100 includes an adjustable 4×8 array 102 of convex lens carriers 104 which pick up thirty-two lenses with a first 4×8 array, configuration, and deposits them in the batched array of thirty-two package carriers at staging area 18, with a single lens in each package carrier. The contact lenses are transferred from the hydration station to the individual convex lens carrier 100 with a gentle puff of air, and retained thereon by surface tension. The robotic transfer array 102 is paused at station 70 to remove any air bubbles entrapped in the residual deionized water that wets the lens. Station 70 includes a plurality of specially configured air nozzles which blow off the residual bubbles.

After the package carriers 20 have been loaded with a contact lens, the inspection pallets 10 are singulated by transport push plate 19 and loaded onto a first overhead conveyor 21. The overhead conveyor 21 then lifts the inspection pallet 10 from the lens loading area and transfers it to the automatic lens inspection system 15, and particularly to the conveyor 15(b) for transport through the automatic lens inspection system. After the lenses have been inspected, the inspection pallet is lifted by the second overhead conveyor 22 and placed on conveyor 12(b) for transport to the deionized water removal station 24. The deionized water is removed by a specially configured nozzle, as described in U.S. Ser. No. 07/999,234, entitled "Solution Removal Nozzle". The deionized water is used to center the lens within the package carrier during the inspection process, but is removed prior to packaging, to enable a precise dosing of a buffered saline solution in the final package.

After removal of the deionized water, the lenses, package carriers and inspection pallet are transported to the package removal pick point 25 which clamps the inspection pallet 10 to enable the second robotic transfer device 200 to remove the package carriers and lenses therefrom.

A programmable logic controller maintains a status register for each of the lenses as they are placed at the robotic transfer staging area 18 and receives a flag from the automatic lens inspection station 15 for each lens that has failed inspection. The second robotic transfer device 200 includes a 2×8 array of independently actuable vacuum grippers which engage the package carriers at the package removal pick point 25. Any packages containing out of spec lenses are then dropped onto conveyor 14 by the robotic transfer device 200 as hereinbefore described, and the remaining lenses are transferred to the consolidation buffer 230 illustrated in FIGS. 4, 5, 8–12.

Figure 5:
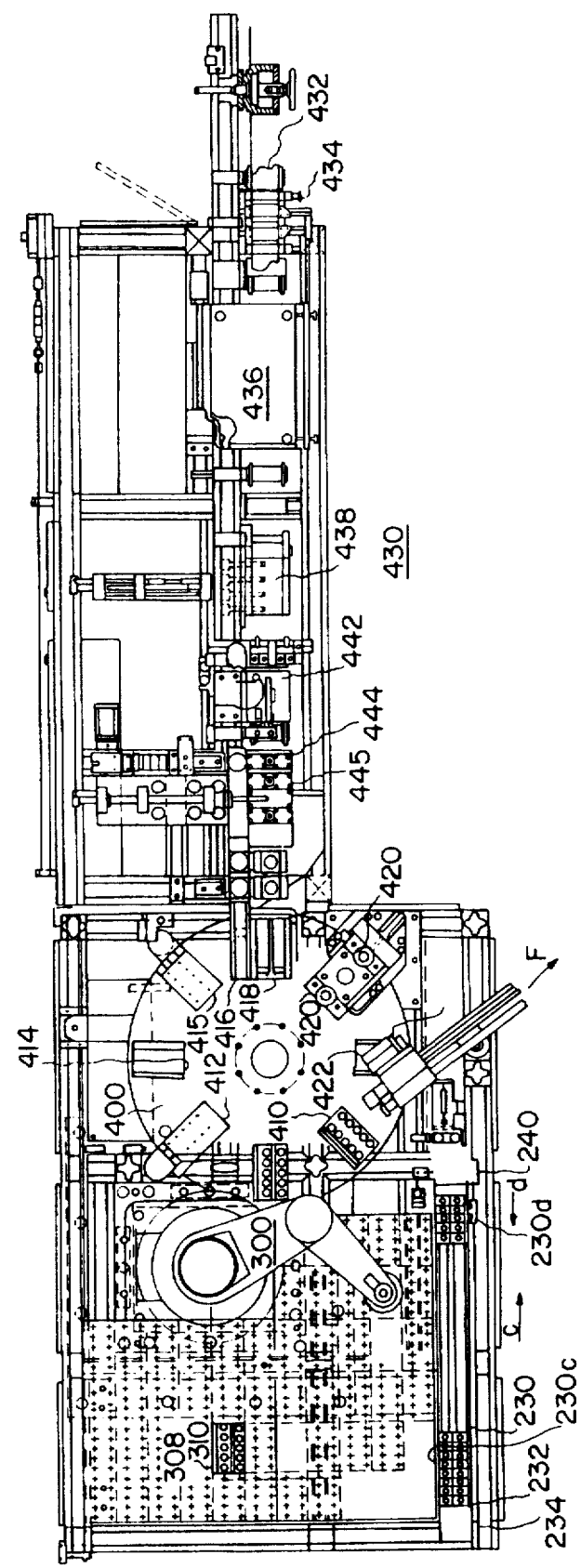
FIG. 5 is a plan view of the apparatus illustrated in FIG. 4 illustrating both a consolidation buffer and a packaging buffer arranged immediately prior to the packaging apparatus.
Figure 12:
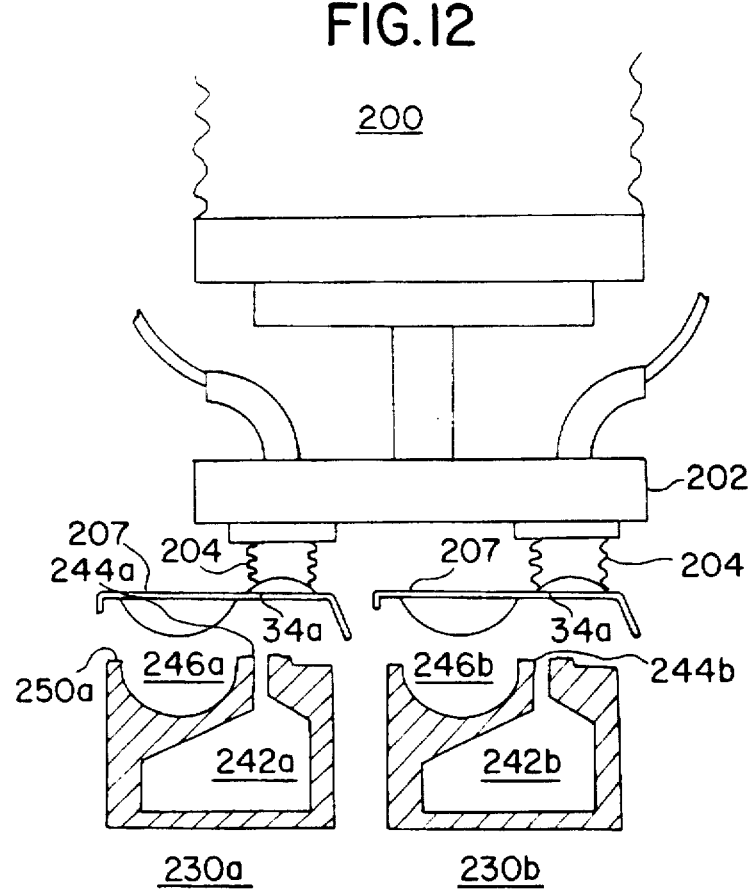
FIG. 12 is a diagrammatic illustration of on individuated robotic handling device transporting contact lens carriers to the vacuum rail consolidation buffer of the present invention.

The consolidation buffer 230 includes a pair of vacuum rails 230(a),(b), cross sections of which are illustrated in FIG. 12, which receive the 2×8 array of package carriers from the second robotic transfer means 200. This 2×8 array is deposited on the consolidation buffer 230 at position 230(c), as illustrated in FIG. 5. A pair of product followers 232,234 engage the string of package carriers and slide them in the direction of arrow C until they engage other package carriers on the consolidation buffer, or until they trigger light sensors 236,238 as previously described. If they encounter existing package carriers, the followers 232,234 push the entire string in the direction of arrow A until the string of package carriers has triggered light sensors 236,238 illustrated in FIG. 1. At this point, the PLC logic controller signals a pneumatic controller which reverses the actuating air pressure for the product followers 232,234 causing them to withdraw. A product indexing pusher 240 then returns the product string in the direction of arrow D to a fixed reference position where the package carriers can be readily engaged by the third robotic handling device 300. The vacuum consolidation rails 230 exert a slight downward pressure on each of the package carriers on the smooth planar area 34(a) to hold the package carriers tightly to the rail and to prevent shingling thereof when being driven forward by product followers 232,234, or indexing pusher 240.

The packaging robotic transfer device 300 includes a 2×5 array 302 of vacuum gripping means 304 which may engage ten of the package carriers at the position illustrated at 230(d) in FIG. 5 for transfer to the indexing turntable 400. The indexing turntable 400 includes a rotatable turntable having eight support pallets 410 mounted thereon for receiving the 2×5 array of package carriers and contact lenses from the packaging robotic transfer device 300.

In normal operation, the robotic transfer device 300 deposits the 2×5 array on support pallet 410 in the number 1 position. If the indexing turntable is not in operation, a large buffer area 308 is provided with a plurality of buffer pallets, one of which is indicated symbolically at 310 in FIG. 5. Buffer area 308 will accommodate approximately fifty pallets for intermediate storage, or approximately 10 minutes of product stream in the event the packaging operation is temporarily interrupted for resupply, maintenance or adjustments.

After the 2×5 array of package carriers has been deposited on support pallet 410, the pallet is rotated to position 412 where optical sensors verify that a package has been loaded at each position and that the packages are correctly aligned on the pallet. Indexing turntable 400 is then rotated again to station 414 wherein each of the individual package carriers are dosed with approximately 950 microliters of a buffered saline solution. The use of deionized water in the hydration and inspection steps significantly speeds the production line as a whole since the time consuming ionic neutralization of the polymer from which the lenses are made does not occur until after the inspection process. When deionized water is used for hydration and inspection, the final step of the process is to introduce buffered saline solution into the final package with the lens and then seal the lens within the package so that final lens equilibration (ionic neutralization, final hydration and final lens dimensioning) is accomplished in the package at room temperature or during sterilization after the lens has been packaged and sealed.

It has been determined empirically that it is desirable that soft contact lenses produced in accordance with the present invention be exposed to atmosphere for no more than sixty minutes between the removal of the deionized water at station 24 (illustrated in FIG. 3) and the dosing of the saline solution at station 414 in FIG. 5. The programmable logic controller which previously received the inspection results from the automated lens inspection system and correlated those results to the individual lenses, also time stamps the individual lenses at the pick up point 25, immediately following the removal of the deionized water at station 24. This time stamp is transferred through consolidation and into the 2×5 array when removed by the packaging robotic transfer device 300. In the event the indexing turntable 400 is not operational, and the 2×5 array is stored in the buffer 308, then the X,Y coordinates of the 2×5 array are stored with the time stamp to enable the packaging robotic transfer device 300 to select "fresh" product, i.e. less than sixty minutes old, at the time the indexing turntable 400 resumes operation. After operation is resumed, the robotic transfer device 300 will then dispose of the "expired" product, rather than transferring it to the indexing turntable.

After saline dosing at station 414, the saline level is checked at station 415 and the support pallet is then rotated under a final product check station 416 to a foil receiving station 418.

As described earlier, each group of package carriers 20 receives a single laminated foil cover sheet which is heat sealed to the package carriers. The lens package is more fully described in U.S. Ser. No. 08/146,754, entitled "Packaging Arrangement for Contact Lenses", also assigned to the assignee of the present invention, the disclosure of which is incorporate herein by reference thereto. The laminated foil stock 432 is fed from a large indefinite spool through a tensioning device 434 to an ink jet printer 436 which prints the lot, batch and power number of the lenses to be packaged. The foil laminate is cut from an indefinite length product into two strips that are heat sealed to the 2×5 product array to provide two separate 1×5 product strips. The foil in between each of the package carriers is also partially severed, scored or perforated to enable the consumer to separate individual packages from the 1×5 array at the time the product is used. The partial scoring is done with a series of rolling blades 440(a)–(d) which are pneumatically biased into a drum 439. The foil is then split into two strips by a foil slitter blade 441 and the foil passes through a stationary gripper and sensing mechanism 442. A video camera 438 and a series of sensors at station 442 are used to provide precise alignment of the information printed by the ink jet printer 436, with the printing fields into which said printing is placed, and the alignment of the perforations or scores provided by rolling blades 439. An advancing gripper 434 is provided to draw a length of foil laminate corresponding to the 1×5 array and sever the strips with a rotating knife 444. At the completion of this cut, the advancing gripper 434 has advanced in the direction of arrow E in FIG. 4 to place the 1×5 foil strips under vacuum gripping heads 418(a),(b). These vacuum gripping heads then reciprocate downwardly to grip the foil, lift it from the advancing and cutting station 434, and transfer the foil to the indexing turntable 400 at the foil placement station 418.

The indexing turntable 400 is then rotated again, and a heat seal mechanism 420 seals a single strip of foil to five separate package carriers in a single high temperature short cycle sealing operation. Indexing turntable 400 is then rotated to position 422 where a reciprocating transfer head 446 removes the sealed product from the indexing turntable 400 and transports it in the direction of arrow F for sterilization and cartoning.

The Consolidation Buffer

The vacuum consolidation buffer of the present invention will be described with respect to FIGS. 8–12 in which 230(a),(b) represent a pair of elongated vacuum rails defined by housing members 231(a),(b) which enclose vacuum plenums 242(a),(b) and which define a plurality of vacuum slits 244(a),(b). While a single elongated slot 244(a),(b) is depicted in FIG. 12, and a plurality of slots are depicted in FIG. 8, it is understood that a variety of aperture shapes and arrangements could be used. As illustrated in FIG. 12, the second robotic transfer device 200 includes a 2×8 array 202 of independently actuable vacuum gripping means 204 which pick a 2×8 array of package carriers from pick point 25, immediately following the removal of the deionized water as previously described with respect to FIG. 3. The 2×8 array is then moved to position 230(c) as illustrated in FIG. 5, and as illustrated in cross-section in FIG. 12 wherein the individual package carriers 20 are positioned immediately above the vacuum rail, and then lowered into engagement therewith, to enable the vacuum slits 244(a),(b) to engage the smooth planar surface 34(a) of the package carrier 20. The vacuum gripping means 204 are then released and the package carriers 20 are then lightly gripped and secured to the consolidation buffer vacuum rails 230(a) ,(b) by a vacuum drawn through plenum 242(a),(b). The purpose of the vacuum rail is to prevent shingling of the individual carrier packages when long strings of the packages are moved by the product followers 232,234. Each of the vacuum rails 230(a),(b) also define an elongated trough 246(a),(b) which receives the bowl of the package carrier 20 and product guides 250(a),(b) which prevent lateral movement of the package carrier as they are slid along the vacuum rail. After the package carrier 20 has been seated on the vacuum rail as illustrated in FIG. 9, the package followers 232,234 advance the respective strings of product or package carriers along the vacuum consolidation rail 230(a)(b) in the direction of arrow C in FIG. 8. As illustrated in FIG. 8, the product followers 232,234 are mounted on pneumatically driven carriages, one of which is visible in elevation view of FIG. 8 and two of which are visible in plan view in FIG. 10. The carriage includes a rodless cylinder 250 mounted for reciprocation on pneumatic cylinder 252 and guided by guide rod 251. The product followers 232,234 are each mounted to the respective carriages by virtue of a pair of parallel rods 254(a),(b),254(c),(d) which are mounted for reciprocation within housings 250(a),(b). The product followers 232,234 are biased into engagement with the carriage members 250(a),(b) by means of springs 256.

The product string is advanced in the direction of arrow C until they trigger one or both of the optical sensors 236,238. When the optical sensors are triggered, the programmable logic controller reverses the pneumatic bias on rodless cylinder 252 and the carriage 250 is then retracted to its original position as illustrated in FIG. 8. In addition, a proximity sensor (not shown) at the end of the stroke will also generate a signal to reverse the direction of carriage 250 if no product has been deposited on either of the consolidation buffer rail 230(a),(b).

After the respective product streams have been advanced from position 230(c) to the optical sensor 238, a product indexing mechanism 240 is actuated to return the product string to a predetermined location for registration with the third robotic transfer device 300 which transfers product onto the packaging indexing table 400. The product indexing mechanism 240 includes a pneumatic cylinder 264 which retracts a push rod 266 and a pusher plate 262 into engagement with the product stream on the vacuum consolidation rail. The product pusher arm 262 then returns the leading edge of the first package carrier on each vacuum rail to a predetermined index position for registration with the 2×5 array 302 mounted on the packaging robotic transfer device 300.

While the invention has been particularly shown and described with respect to the preferred embodiments thereof, it will be understood by those skilled in the art that the foregoing, and other changes in form and details, may be made therein without departing from the spirit and scope of the invention, which is limited only by the scope of the following claims.

We claim:

1. A consolidation buffer for consolidating a plurality of products having random variations in product arrangement, said buffer comprising:
   (a) at least one vacuum rail, said vacuum rail having a vacuum plenum, an input end and an output end, said vacuum rail receiving a plurality of products with random variations in the arrangement thereof at said input end, said vacuum plenum having at least one aperture therein to enable a vacuum drawn in said plenum to lightly grip a product placed on said rail;
   (b) at least one product follower mounted for reciprocal movement along said rail from said input end to said output end, said product follower engaging products placed on said rail when reciprocating and sliding them along said rail from said input end to said output end to consolidate said plurality of products;
   (c) a longitudinal drive for reciprocating said product follower along said rail; and
   (d) a sensor for determining the presence of product at the output and of said rail, and initiating a signal for said longitudinal drive to reciprocate said product follower to said input position.

2. A consolidation buffer for consolidating a plurality of products having random variations in product arrangement, as claimed in claim 1, wherein said buffer further includes a product indexer for returning products received at said sensor to a predetermined product output position.

3. A consolidation buffer for consolidating a plurality of products having random variations in product arrangement, as claimed in claim 1, wherein said buffer includes at least two parallel vacuum rails adjacent each other, with independently actuable product followers for each rail.

4. A consolidation buffer for consolidating a plurality of products having random variations in product arrangement, as claimed in claim 1, wherein said longitudinal drive is a pneumatically actuated rodless cylinder.

5. A consolidation buffer for consolidating a plurality of products having random variations in product arrangement, as claimed in claim 1, wherein said aperture is an elongate slot which extends from said input end to said output end, and communicates with said vacuum plenum along its length.

6. A consolidation buffer for consolidating a plurality of products having random variations in product arrangement, as claimed in claim 1, wherein said aperture is a plurality of apertures arranged along said rail, from said input end to said output end.

7. A consolidation buffer for consolidating a plurality of products having random variations in product arrangement, as claimed in claim 1, wherein said product follower is resiliently mounted on said longitudinal drive means.

8. A consolidation buffer for consolidating a plurality of products having random variations in product arrangement, as claimed in claim 1, wherein said buffer includes longitudinal guides for restraining lateral movement of said product when sliding.

9. A consolidation buffer for consolidating a plurality of products having random variations in product arrangement, as claimed in claim 2, wherein said buffer includes at least two parallel vacuum rails adjacent each other, with independently actuable product followers for each rail, said indexer returning products on both rails to said predetermined position.

10. A consolidation buffer for consolidating a plurality of products having random variations in product arrangement, as claimed in claim 9, wherein said buffer receives 2 by an array of products with random variations in said array at said input end, and provides a consolidated array of products at said output end, said product arranged and positioned for robotic handling.

* * * * *